United States Patent
Phadke et al.

(10) Patent No.: US 7,136,294 B2
(45) Date of Patent: Nov. 14, 2006

(54) SOFT SWITCHED ZERO VOLTAGE TRANSITION FULL BRIDGE CONVERTER

(75) Inventors: Vijay Gangadhar Phadke, Pasig (PH); Arlaindo Vitug Asuncion, Parañaque (PH); Israel Gomez Beltran, Rizal (PH)

(73) Assignee: Astec International Limited, Hong Kong (HK)

( * ) Notice: Subject to any disclaimer, the term of this patent is extended or adjusted under 35 U.S.C. 154(b) by 3 days.

(21) Appl. No.: 10/913,067

(22) Filed: Aug. 6, 2004

(65) Prior Publication Data
US 2005/0030778 A1 Feb. 10, 2005

Related U.S. Application Data

(60) Provisional application No. 60/493,609, filed on Aug. 9, 2003.

(51) Int. Cl.
*H02M 7/5387* (2006.01)
(52) U.S. Cl. ........................................ 363/132; 363/17
(58) Field of Classification Search ............ 363/16–20, 363/97, 131, 132, 98, 91
See application file for complete search history.

(56) References Cited

U.S. PATENT DOCUMENTS

| | | | |
|---|---|---|---|
| 4,648,017 A * | 3/1987 | Nerone | 363/80 |
| 5,132,889 A | 7/1992 | Hitchcock et al. | 363/17 |
| 5,189,601 A | 2/1993 | Sellers | 363/21 |
| 6,016,258 A * | 1/2000 | Jain et al. | 363/17 |
| 6,246,599 B1 * | 6/2001 | Jang et al. | 363/132 |

* cited by examiner

*Primary Examiner*—Rajnikant B. Patel
(74) *Attorney, Agent, or Firm*—Nixon Peabody LLP

(57) ABSTRACT

A soft switched zero voltage transition full bridge converter for reducing power loss at very light loads for zero voltage switching (ZVS) converters operating at high frequency. The converter has four switches in two switching legs, each having two switches connected in series between two input voltage terminals. Junction points of the legs are coupled to a primary winding of a transformer. The transformer has a secondary winding from which an output voltage of the converter is derived by rectifying and filtering. A pair of capacitive voltage dividers are connected between the input terminals, each formed by two small capacitors, each having a parallel-connected diode. The output voltage is regulated by phase shift control of the switches. The capacitors are selected small enough for storing only enough energy to enable ZVS in conjunction with two resonant inductors. The converter enables reduced component size of the inductors and energy storage capacitors.

14 Claims, 19 Drawing Sheets

SOFT SWITCHED ZERO VOLTAGE TRANSITION FULL BRIDGE CONVERTER

CROSS REFERENCE TO RELATED APPLICATION

This application claims the benefit of U.S. Provisional Application No. 60/493,609, filed Aug. 9, 2003, which is incorporated by reference herein.

FIELD OF INVENTION

The present invention relates in general to power converter circuits and more particularly to zero voltage switching (ZVS) half bridge and full bridge converters and a circuit that reduces the high power loss at very light loads for such converters operating at high frequency.

BACKGROUND OF INVENTION

The modern technology trend is towards higher density and lower profile electrical devices. This trend has driven a demand for improving the power density of power supplies. As a result, various techniques have been developed to increase the switching frequencies of the power supply in order to reduce the size and bulk of magnetic components and filtering elements. Problems experienced with increasing the operating frequencies include higher switching losses and the generation of worse electromagnetic interference (EMI). Since the switching losses in power semiconductors are directly proportional to the operating frequency, thermal management is also a big challenge, since the space saved by using smaller filtering components is more than offset by the need for larger heat sinks.

The development of a method of soft switching power supplies addressed most of the above problems. For the DC/DC conversion stage, the soft, zero voltage switching (ZVS) method for the power switches eliminated turn on losses. At the same time, this method improved EMI performance by lowering fast rising switching currents. Thus, the method significantly improved the efficiency of the power converter and enabled switching at higher frequencies. The demand for higher power density, however, is increasing unabated. New problems are surfacing as the soft, ZVS converter is being switched at ever higher frequencies. Conventional soft switching converters switching at high frequencies are exhibiting high power losses during light load conditions. As a result, although such converters are very efficient at full load, they are prone to failure at light loads. Many semiconductor manufacturers attribute this failure to various semiconductor phenomena, such as the reverse recovery speed of the MOSFET body diode, and the construction of the MOSFET's channel, etc. One other significant problem, however, is that it is difficult to charge and discharge the output capacitance of the MOSFET bridge switching elements at light loads when the converter is in the hard switching mode. This is because the energy stored in the resonant choke in such converters is very low and therefore cannot charge/discharge the output capacitance of the bridge switching elements. This is true for converters having a primary side resonant choke or a saturable choke on the secondary side. This problem exists in all known ZVS control techniques. In fact, this drawback at light load for conventional soft switching converters is even worse than for conventional hard switching bridge converters.

FIG. 1 illustrates a worst case scenario when the power supply is at no-load. At no-load, the only energy available for ZVS switching is the magnetizing current of the power transformer. Since this current is typically very low, it cannot charge/discharge the MOSFET switch capacitance in the required delay time.

As shown in FIG. 1, the circuit on the left side shows a bridge circuit 10 with a transformer primary winding. Since the transformer magnetizing current is very low at a no-load condition, negligible energy is stored in the primary winding or in any series resonant choke. The series resonant choke for the circuit in FIG. 1 could be the leakage inductance of the transformer or any external inductance. Since the energy stored in the magnetizing inductance is very low, it cannot enable ZVS of the bridge elements, and thus, can be neglected in the analysis. The bridge circuit 20 on the right side in FIG. 1 shows this worst case scenario where the transformer winding has no effect.

To analyze the circuit in FIG. 1, it is first assumed that an active diagonal is operating, e.g., switches Qa and Qd are on. At the end of the active period, switch Qd will turn off. The voltage across it will not rise since there is no charging current available. As a result, the voltage across Qd will remain close to zero during the dead time at the end of the active period. Thus, the MOSFET switch Qd output capacitance, shown as capacitor Cd, is at zero volts and fully discharged and the capacitance across switch Qc, shown as capacitor Cc, is fully charged at the Bulk + voltage shown. In typically operating soft switching converters, switch Qc will be turned on after a short delay. When switch Qc turns on, the energy stored in capacitor Cc is fully discharged in switch Qc. At the same time, as the lower end of the switch Qc rises to the Bulk + voltage level, the capacitance Cd of the lower switch Qd also gets charged through switch Qc. Thus, there are two kinds of resistive losses in switch Qc: one due to the discharging of capacitor Cc and other due to the charging of capacitor Cd. These losses result in power dissipation which is proportional to the operating frequency as represented in the following formula:

$$P\text{turn-on} = (0.5 \times Cc \times (V\text{bulk})^2 \times Fsw) + (0.5 \times Cd \times (V\text{bulk})^2 \times Fsw)$$

Where Fsw is the switching frequency. Assuming Ca=Cb=Cc=Cd:

$$P\text{turn-on} = Cc \times (V\text{bulk})^2 \times Fsw$$

These resistive losses, and the resulting power dissipation, may be tolerable at lower switching frequencies in the range of 100 kHz to 200 kHz. At much higher frequencies, e.g., above 400 kHz, however, these losses predominant such that the total power lost in the bridge switches at light loads exceeds the losses at full-load. This predominance is illustrated in FIG. 1A for a typical soft switching full bridge converter. FIG. 1A shows total losses in the entire converter versus the load percentage. At light loads, most of this total loss is due to losses in the bridge switching devices.

FIG. 2 is a circuit diagram of an exemplary prior art full bridge power converter 30 where a primary side resonant inductor is used for achieving soft, zero voltage switching. As is seen, a resonant inductor Lr is inserted in series with the primary of the power transformer. Inductor Lr could also be the parasitic leakage inductance of the transformer. A simplified representation of switches Qa, Qb, Qc, and Qd is shown in FIGS. 2–4 such that the switch capacitances of the corresponding switches are not shown. The existence of the switch capacitances is well known in the art. For reference, the switch capacitances are as shown in bridge 20 for switches Qa, Qb, Qc, and Qd in FIG. 1. FIG. 2A is a set of voltage and current waveforms illustrating the operation of the power converter in FIG. 2.

During the active period of the switching diagonal, e.g., Qa and Qd are on, energy is stored in inductor Lr due to the primary current flowing through it. When one of the diagonal MOSFET switches (e.g., Qd) turns off, the energy stored in inductor Lr is used to charge that MOSFET's output capacitance and to discharge the output capacitance of the other MOSFET in the same vertical leg. As a result, ZVS action is achieved.

In addition to the fact that the circuit topology in FIG. 2 has the drawback of losses at light load at higher frequencies, since the capacitance of each MOSFET switch is intrinsic and does not change with frequency, the size of the resonant inductor Lr is independent of frequency. As a result it may be quite large for a high frequency power supply. Inductor Lr is also lossy since it handles very high primary full load currents and its flux swings in both directions, generating high core losses. The series inductor in FIG. 2 also introduces a delay, e.g., 200 nS, which reduces the available maximum duty cycle of the converter. This delay is a serious drawback at higher frequencies.

FIG. 3 is an exemplary prior art full bridge converter 40 where two saturable inductors, Ls1 and Ls2, are connected in series with the secondary side's rectifier diodes. In operation, for an active transformer period when diagonal Qa-Qd is conducting, the dotted end of the secondary is positive and D31 is forward biased, providing current to the output load through inductors Ls1 and Lout. This current saturates inductor Ls1. At the end of the active period, Qd turns off and the secondary voltage starts to fall. Since Ls1 is saturated and Ls2 is in blocking mode since D32 is reverse biased, this forces the current in output inductor Lout to keep flowing through the upper half of the secondary, i.e., D31-Ls1. This DC inductor current also has an AC component in the form of ripple current. The transformer action causes this ripple current to be reflected back to the primary side, which forces the primary current to keep flowing while achieving ZVS action. Similar ZVS action is repeated by Ls2 in the next active period.

Although the circuit in FIG. 3 achieves ZVS action satisfactorily at higher loads, it still has the drawback of losses at light load at higher frequencies. At frequencies above 200 kHz, for example, the core losses in the secondary side saturable cores of Ls1 and Ls2 are very high and could result in thermal runaway for the square loop amorphous cores typically used. The blocking effect of these saturable inductors also reduces the available duty cycle.

FIG. 4 shows a prior art full bridge converter 50 including two external resonant inductors Lr11, Lr21 and two split capacitors C11, C21 to generate a split bulk + voltage rail. FIG. 4A is a set of exemplary voltage and current waveforms illustrating the operation of the power converter in FIG. 4 for exemplary circuit values as shown. In operation, when the diagonal full bridge devices, e.g., Qa, Qd, are in conduction, current flows in the respective inductor (Lr11, Lr21) and energy is stored. At the end of the active period when the switch, e.g., Qd, turns off, the energy stored in the inductor is utilized to achieve the ZVS transition.

The prior art converter 50 shown in FIG. 4 may provide zero voltage switching down to very light loads for all four full bridge MOSFETS, Qa, Qb, Qc and Qd, if the power transformer is non-ideal, i.e., has high leakage inductance, and thus may be able to address the problem of losses at light load. However, this circuit has several drawbacks. The ripple current stress on the capacitors can be significant, such that capacitors of higher cost are required. Instead of using such costly capacitors, each of these bulk capacitors can alternatively be split into a series combination of two. The drawback of this solution is that this greater number of capacitors will occupy a larger volume, thereby creating an inefficient use of the available space. Another drawback of the circuit in FIG. 4 is that any inequality between the values of C11 and C21 or between the values of Lr11 and Lr21 can create problems with the current mode control of the circuit.

Another drawback of this circuit is as follows. The circuit in FIG. 4 can provide satisfactory ZVS transition from the active to the passive state. During the transition from the passive to the active state, however, the energy in inductors Lr11 and Lr21 can flow through the transformer and be transferred to the load instead of achieving ZVS transition of the passive to active leg. This drawback is lessened in applications having a large transformer leakage inductance, but for transformers with very low leakage inductance, this problem in the converter 50 shown in FIG. 4 may result in some hard switching of one leg of the bridge.

The heat sink for most power supplies is designed to accommodate heat dissipation at full-load. Although a cooling fan is typically provided for the power supply, the fan is typically controlled such that fan speed is a function of the load. Thus, at light loads, the dissipation in bridge switches is higher than at full-load and much less cooling air is available. As a result, these devices may fail due to thermal runaway. Prior art devices have addressed this failure mode through a "cold plate" approach. In this approach, the bridge switches are mounted on the same large heat sink used for cooling the boost converter or secondary rectifiers. Since the power losses in the boost converter or output rectifiers are negligible at light loads, the large heat sink can handle the extra losses in the bridge devices at light load, and thereby avoid thermal runaway. This cold plate approach is inefficient and cannot meet more demanding efficiency requirements at light load conditions. The cold plate approach also complicates the construction of the power supply as several safety requirements must be met as well, e.g., requiring insulation on the secondary side, thus rendering this approach inconsistent with high density requirements.

A circuit is therefore needed which solves the above described drawbacks of losses at light load in high frequency soft switching power converters.

SUMMARY OF THE INVENTION

The present invention solves the problem of power loss at light loads for soft ZVS half bridge or full bridge converter by providing a circuit that reduces the internal power losses of the soft switching bridge converter at light loads and enables very high frequency operation without requiring a full cold plate approach.

Another advantage of the present invention is that it enables control of the size of inductor and energy storage capacitors depending on the design tradeoffs for a particular application, thereby providing design flexibility Another advantage of the present invention is that it lowers EMI at all load conditions.

Still another advantage of the present invention is that, unlike conventional ZVS converters, the value of the ZVS inductance reduces with increasing operating frequency, thereby enabling higher density packaging by reducing component size.

Broadly stated, the present invention provides, in a DC-DC converter having first and second input terminals to which an input DC voltage is coupled and two output terminals where the output DC power is provided, a bridge having a first and second switching leg, each leg comprising two controlled switches connected in series, each switch having a switch capacitance and a control input, each switching leg connected between the input terminals and having a junction point between its series-connected switches; a transformer having a primary winding and a secondary winding each having a first and second end, the first end of the primary winding is connected to the junction point of the first switching leg; a rectifier and output filter circuit coupled between the secondary winding and the output terminals, a circuit comprising a first capacitive voltage divider formed by a first and a second capacitor and connected between the input terminals; a second capacitive voltage divider formed by a third and a fourth capacitor and connected between the input terminals; a first and second diode each connected in parallel with a respective capacitor of the first capacitive voltage divider; a third and fourth diode each connected in parallel with a respective capacitor of the second capacitive voltage divider; a first inductor connected in series between the junction point of the first switching leg and a junction of the first and second capacitor; and a second inductor connected in series between the junction point of the second switching leg and a junction of the third and fourth capacitor.

Broadly stated, the present invention also provides a DC-DC converter having first and second input terminals to which an input DC voltage is coupled and two output terminals where the output DC power is provided, comprising a bridge having a first and second switching leg, each leg comprising two controlled switches connected in series, each switch having a switch capacitance and a control input, each switching leg connected between the input terminals and having a junction point between its series-connected switches; a transformer having a primary winding and a secondary winding each having a first and second end, the first end of the primary winding is connected to the junction point of the first switching leg; a rectifier and output filter circuit coupled between the secondary winding and the output terminals; a first capacitive voltage divider formed by a first and a second capacitor and connected between the input terminals; a second capacitive voltage divider formed by a third and a fourth capacitor and connected between the input terminals; a first and second diode each connected in parallel with a respective capacitor of the first capacitive voltage divider; a third and fourth diode each connected in parallel with a respective capacitor of the second capacitive voltage divider; a first resonant inductor connected in series between the junction point of the first switching leg and a junction of the first and second capacitor; and a second resonant inductor connected in series between the junction point of the second switching leg and a junction of the third and fourth capacitor.

BRIEF DESCRIPTION OF THE DRAWINGS

The foregoing aspects and the attendant advantages of the present invention will become more readily appreciated by reference to the following detailed description, when taken in conjunction with the accompanying drawings, wherein.

DETAILED DESCRIPTION OF THE INVENTION

Figure 4:
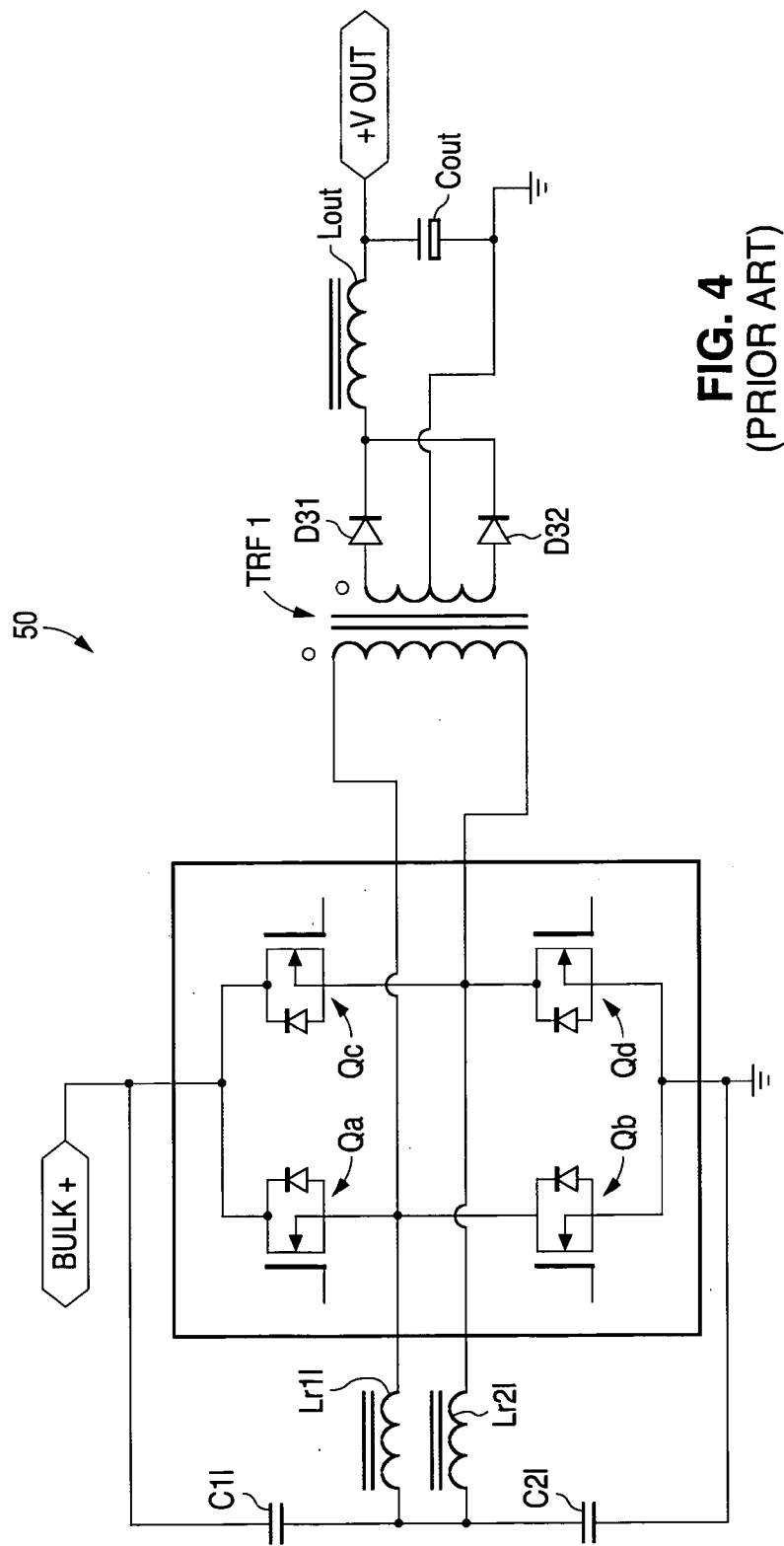
FIG. 4 shows a prior art full bridge converter including two external resonant inductors and two split capacitors for generating a split bulk voltage rail.
Figure 4A:
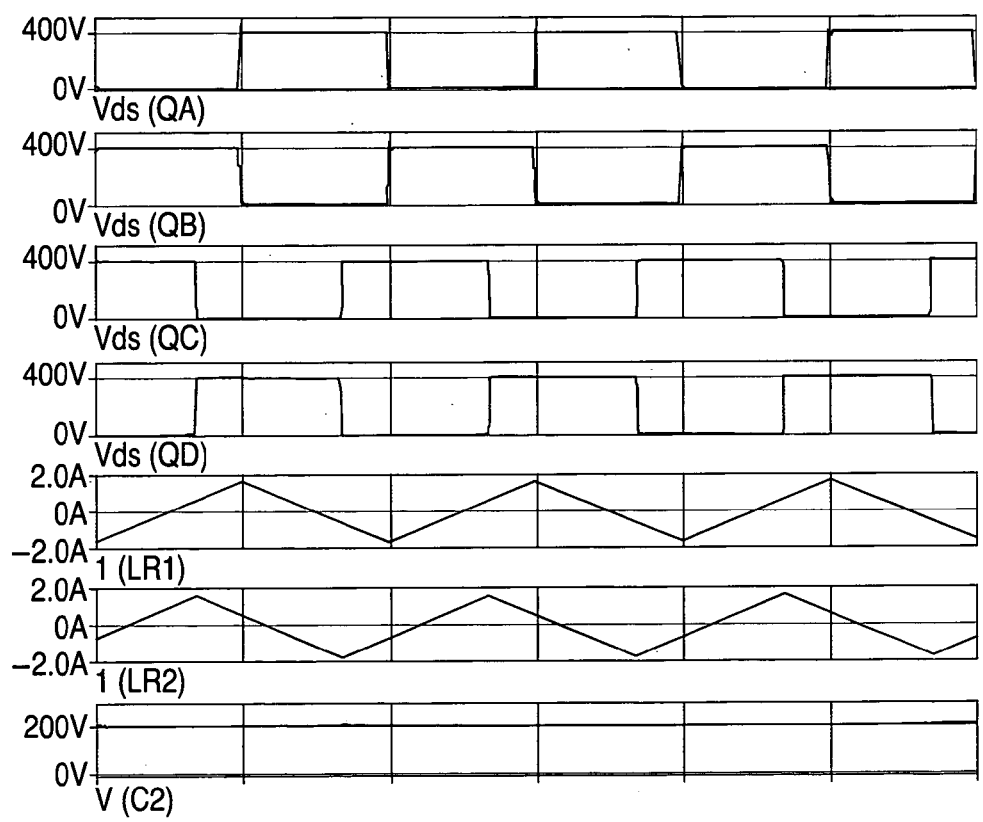
FIG. 4A is a set of exemplary voltage and current waveforms illustrating the operation of the power converter in FIG. 4.

In the prior art converter shown in FIG. 4, the capacitor divider C11 and C21 is expected to deliver a constant voltage bias for the ZVS inductors throughout the operational period. This may require a higher value of capacitance for these capacitors. This requirement may also increase demands on each ZVS inductor since each must withstand this voltage bias without saturating. The present invention reduces the demands on these components. The present invention will now be described in more detail with reference to FIGS. 5–9.

Figure 1:
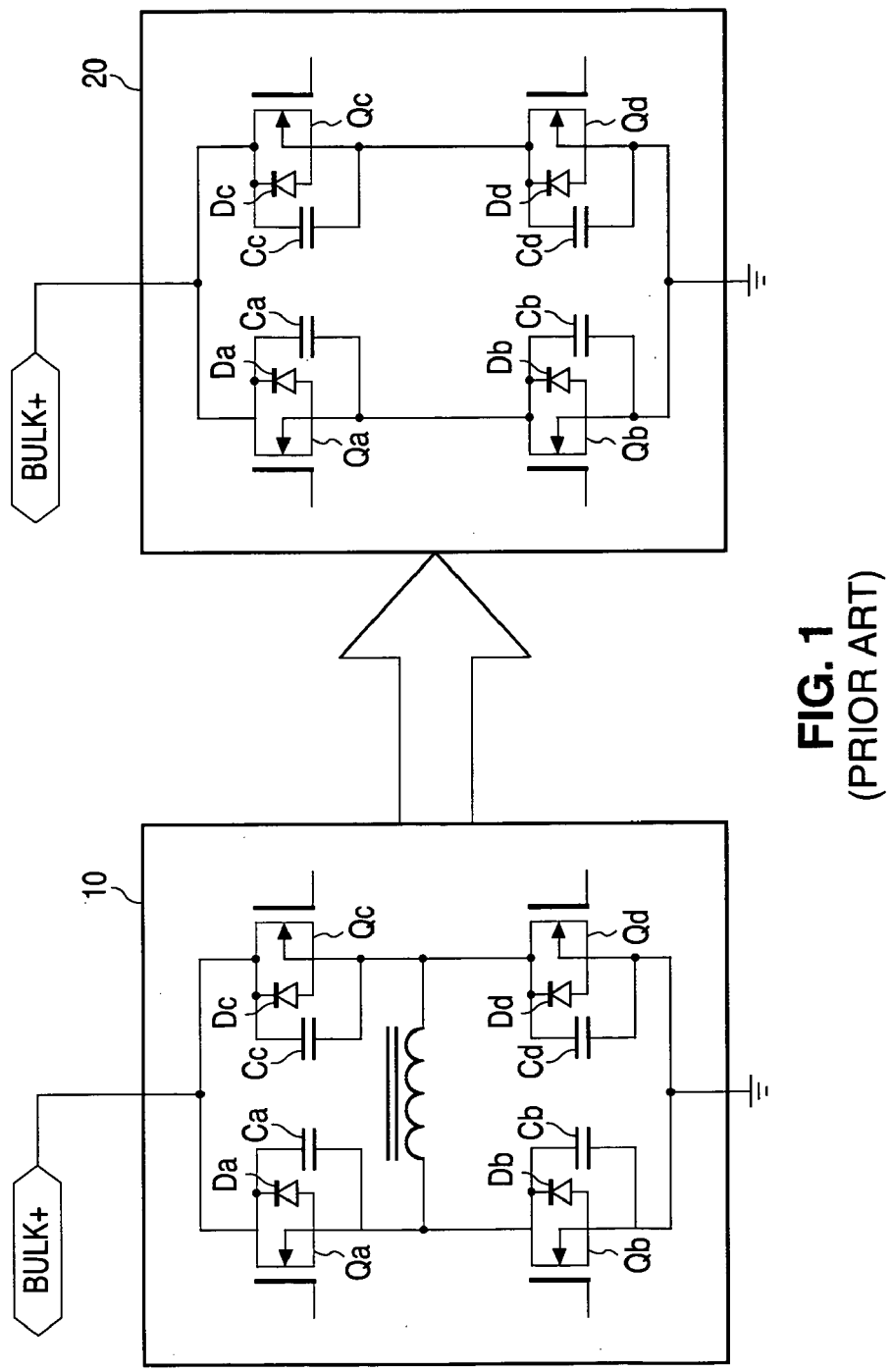
FIG. 1 shows two prior art circuits to illustrate the worst case scenario when a full bridge power supply is at no-load.
Figure 1A:
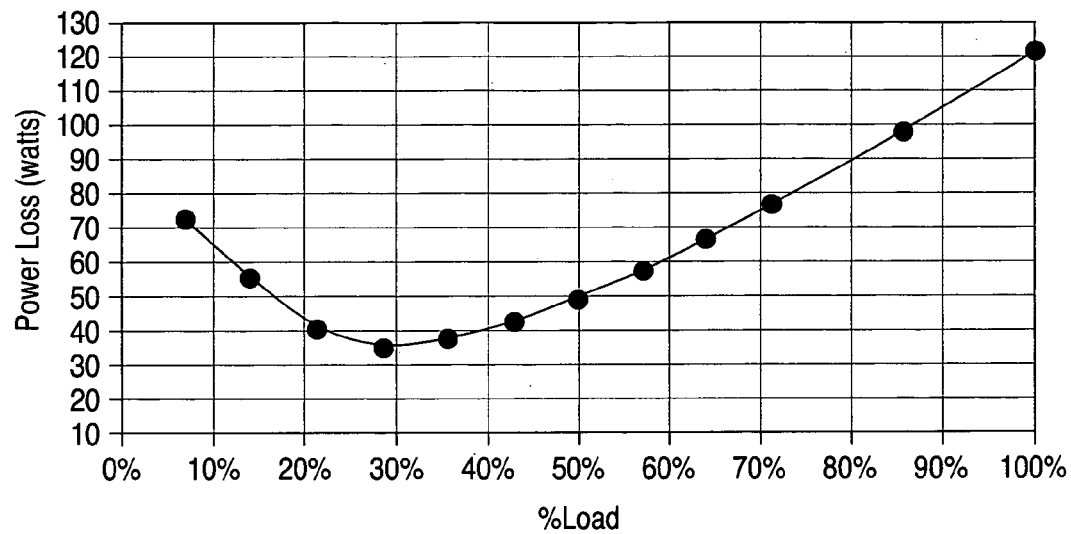
FIG. 1A illustrate a waveform showing power loss versus load for a typical prior art ZVS full bridge converter.
Figure 5:
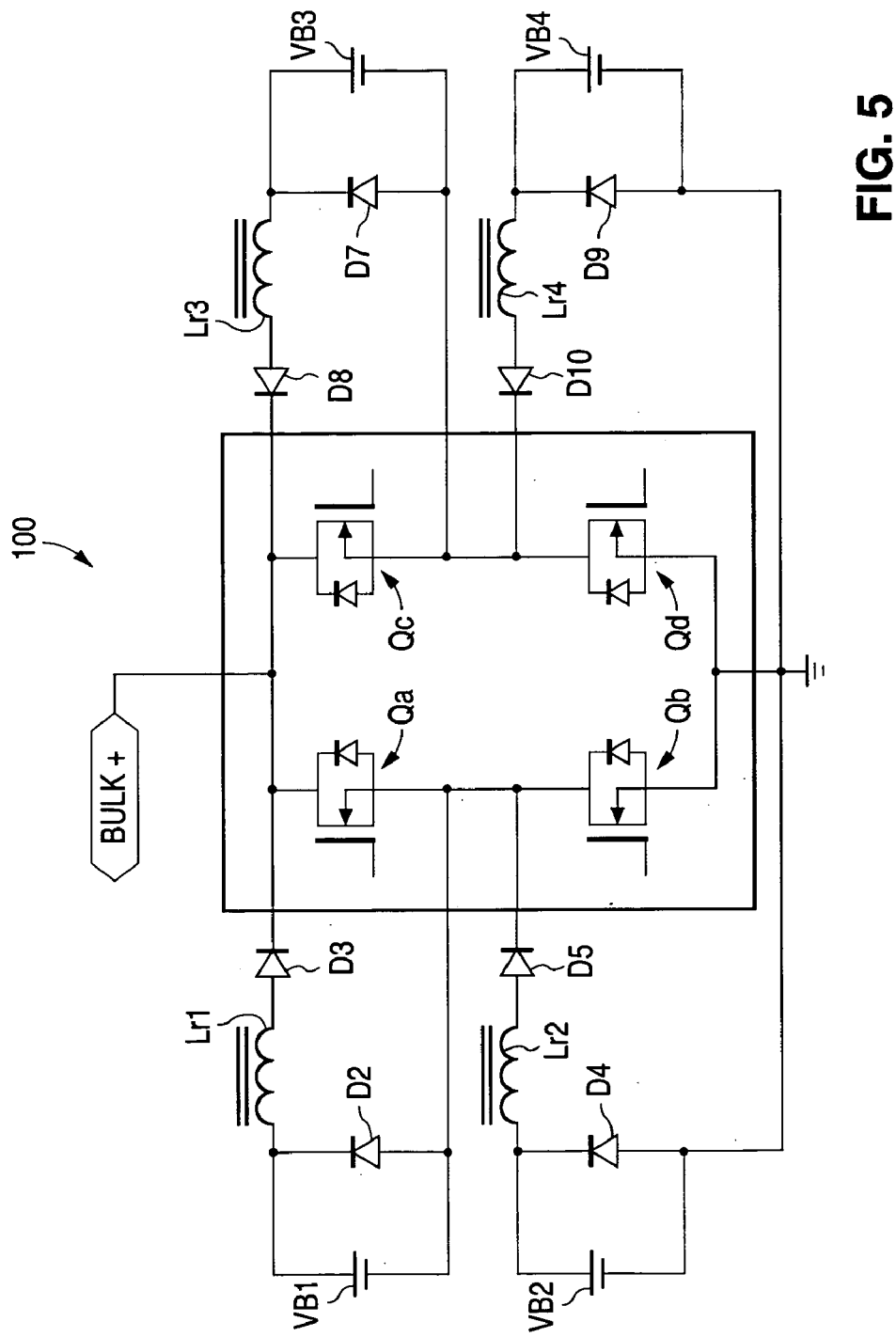
FIG. 5 is circuit diagram for illustrating a basic concept of the present invention.
Figure 5A:
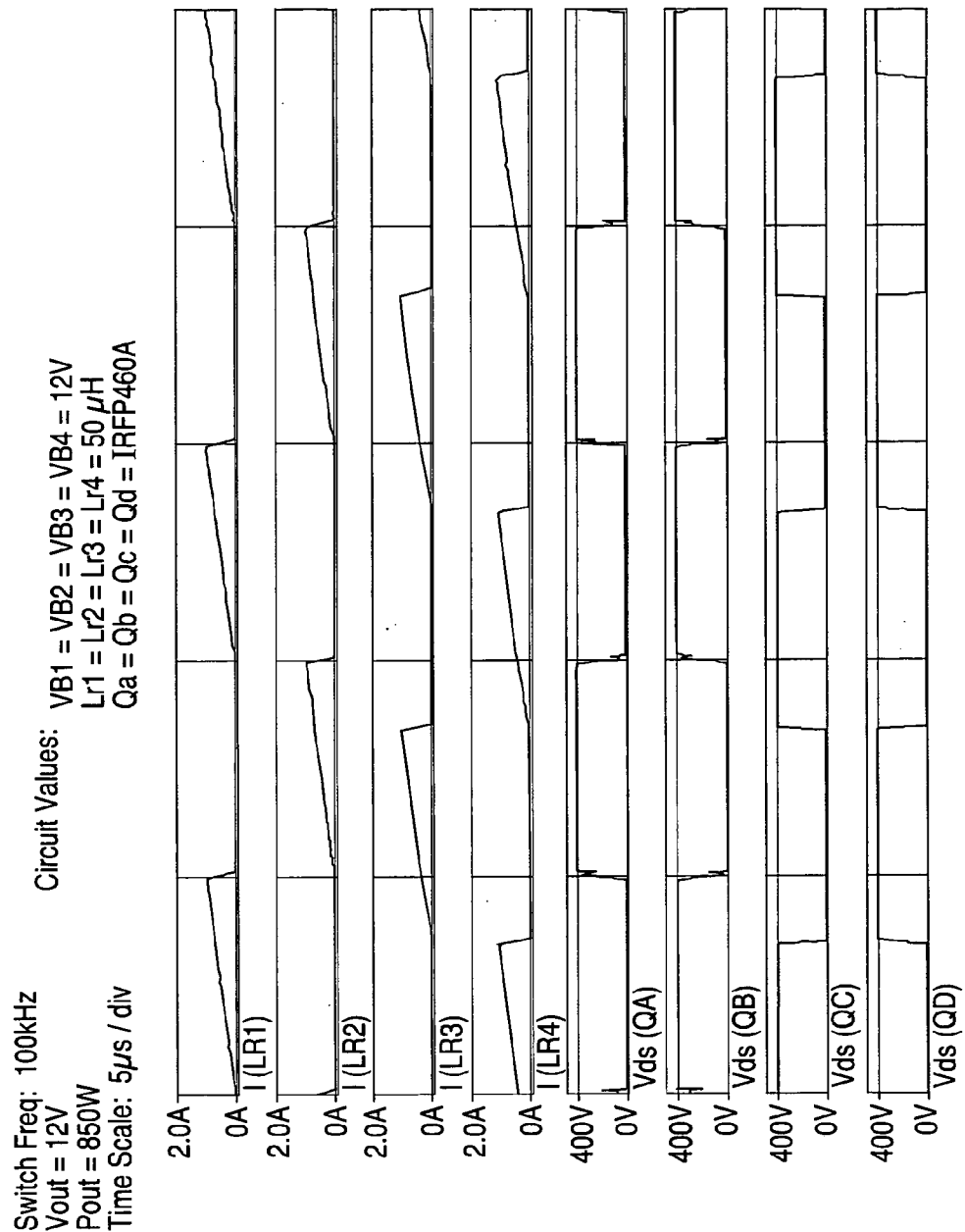
FIG. 5A is a set of exemplary waveforms and exemplary component values for the circuit in FIG. 5.

FIG. 5 is a circuit diagram of a power converter 100 to illustrate a basic concept of the present invention. In FIG. 5, four inductors, Lr1, Lr2, Lr3, and Lr4, are used, each with corresponding diodes and four voltage sources identified as VB1, VB2, VB3, and VB4. These voltage sources are much lower in voltage as compared to the prior art circuit of FIG. 4, and allow appropriate trimming of the inductors by varying the voltage levels. The circuit shown in FIG. 5, however, uses hard voltage sources. FIG. 5A is a set of exemplary waveforms and exemplary component values for the circuit shown in FIG. 5. A simplified representation of switches Qa, Qb, Qc, and Qd is shown in FIGS. 5–9 such that the switch capacitances of the corresponding switches are not shown. The existence of the switch capacitances is well known in the art. For reference, the switch capacitances are as shown in bridge 20 for switches Qa, Qb, Qc, and Qd in FIG. 1.

Figure 6:
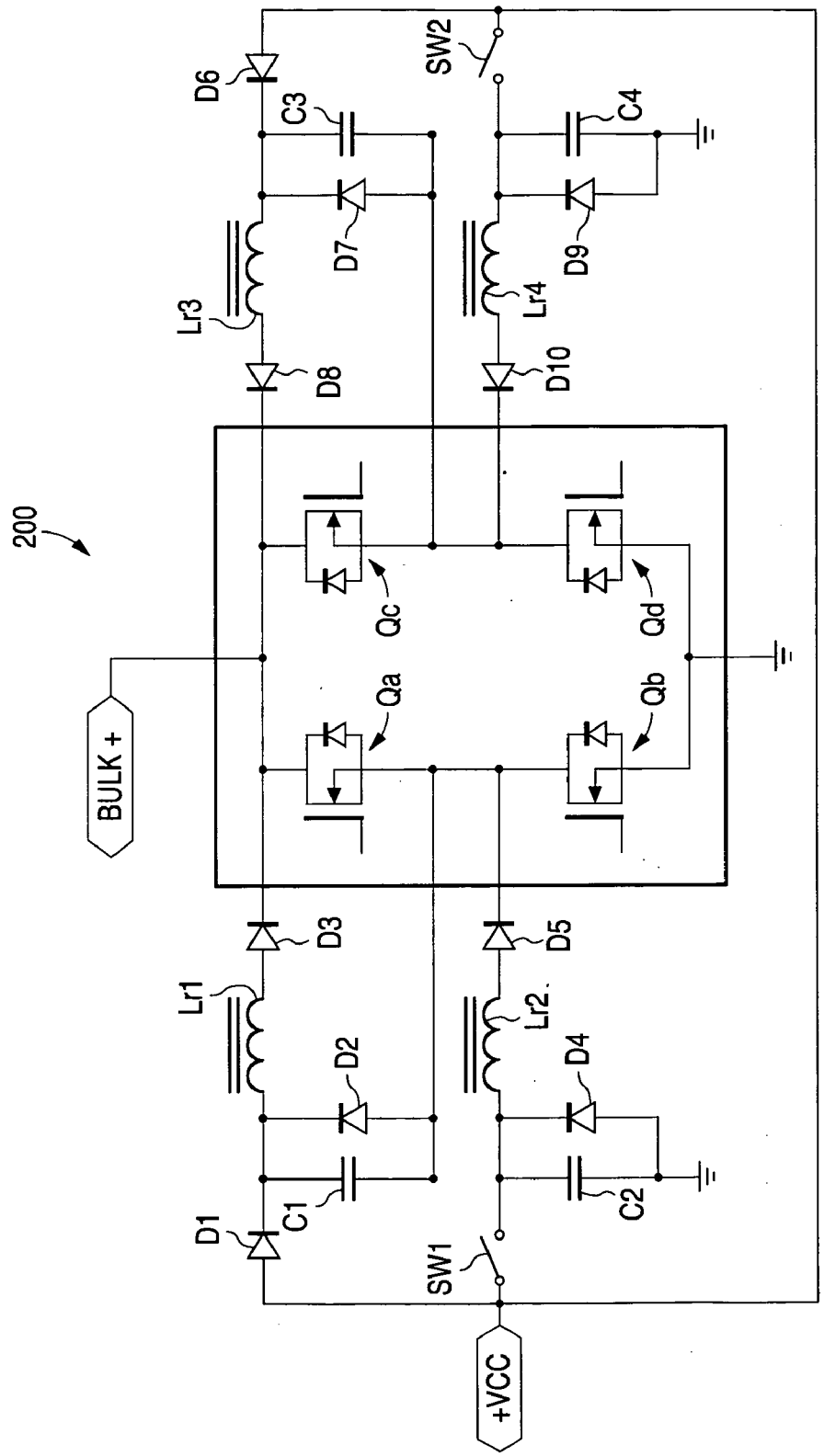
FIG. 6 is an embodiment of the circuit according to the present invention wherein energy available from the voltage sources in FIG. 5 is reduced to allow much higher flexibility and component size reduction.

FIG. 6 illustrates a circuit 200 according to the present invention that requires only one voltage source rather than the four sources shown in FIG. 5. As seen in FIG. 6, one voltage source +VCC generates the required high side, boot strap voltages as shown.

In operation, when the lower switch Qb is on, capacitor C1 is charged through the boot strap diode D1. The capacitance value of capacitor C1 is selected such that it stores enough energy to achieve zero voltage transition switching of switch Qa. Thus the capacitance of capacitor C1 is determined by the output capacitance of the switch and the bias voltage level of voltage source +VCC. When switch Qa turns on, the current builds up in inductor Lr1. Due to the limited amount of energy in capacitor C1, it soon discharges and inductor Lr1 free wheels its current through the reverse diode D2 connected across capacitor C1. This freewheeling continues while switch Qa is on. During this time, very little energy in Lr1 is lost as the free wheeling current falls by a negligible value. When switch Qa turns off, this current flowing through Lr1 continues to pass through the output capacitance of switch Qa, and the voltage at the source terminal of switch Qa starts to fall while charging the output capacitance. At the same time, this discharges the output capacitance of lower switch Qb and prepares it for zero voltage transition switching. A similar action occurs for all of the bridge switches. Two auxiliary switches SW1 and SW2 are also included in the circuit 200 in FIG. 6. Switch SW1 is controlled so that it is turned on to charge capacitor C2 when switch Qa is conducting. Switch SW2 is controlled so that it is turned on to charge capacitor C4 when switch Qc is conducting.

Figure 7:
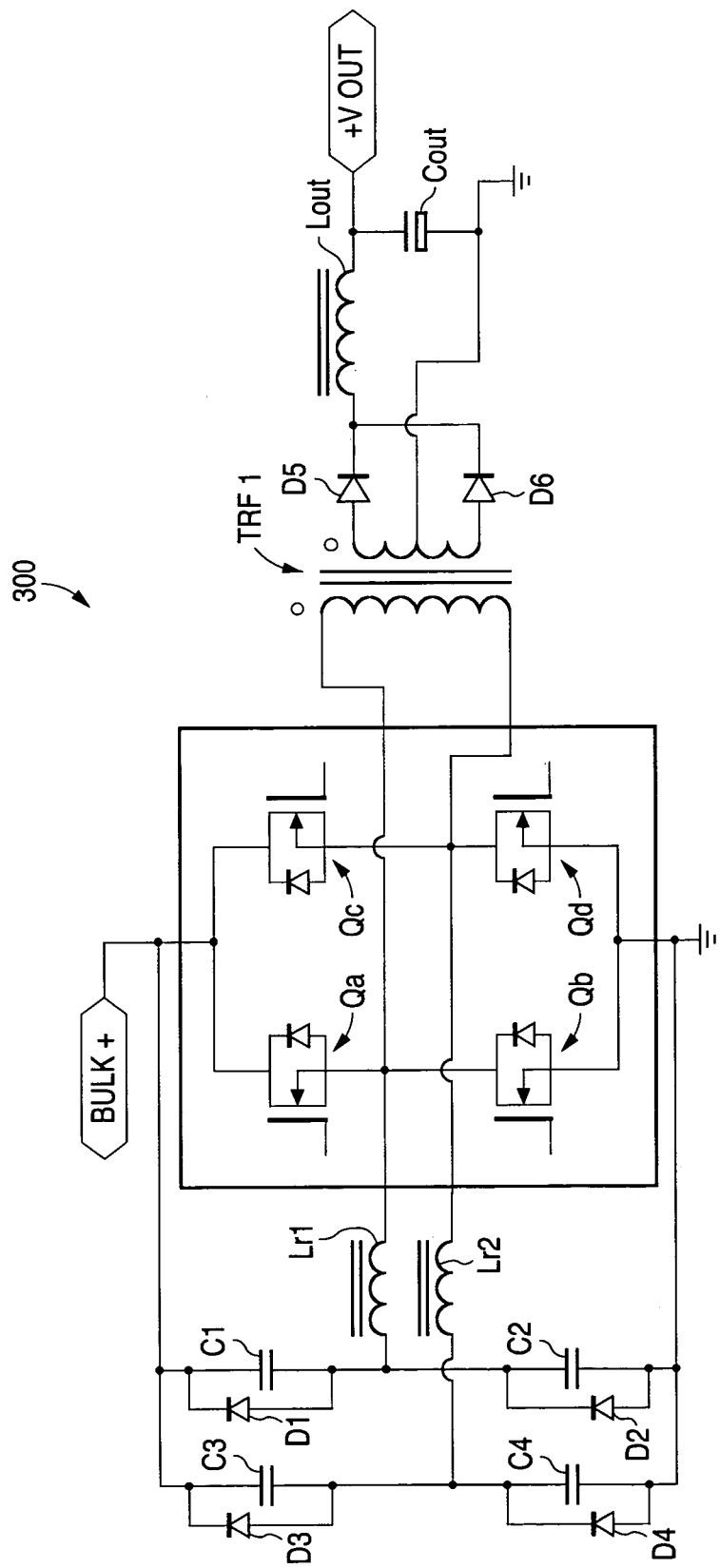
FIG. 7 is a circuit embodiment according to the present invention that reduces the complexity of the circuit in FIG. 6.
Figure 8A:
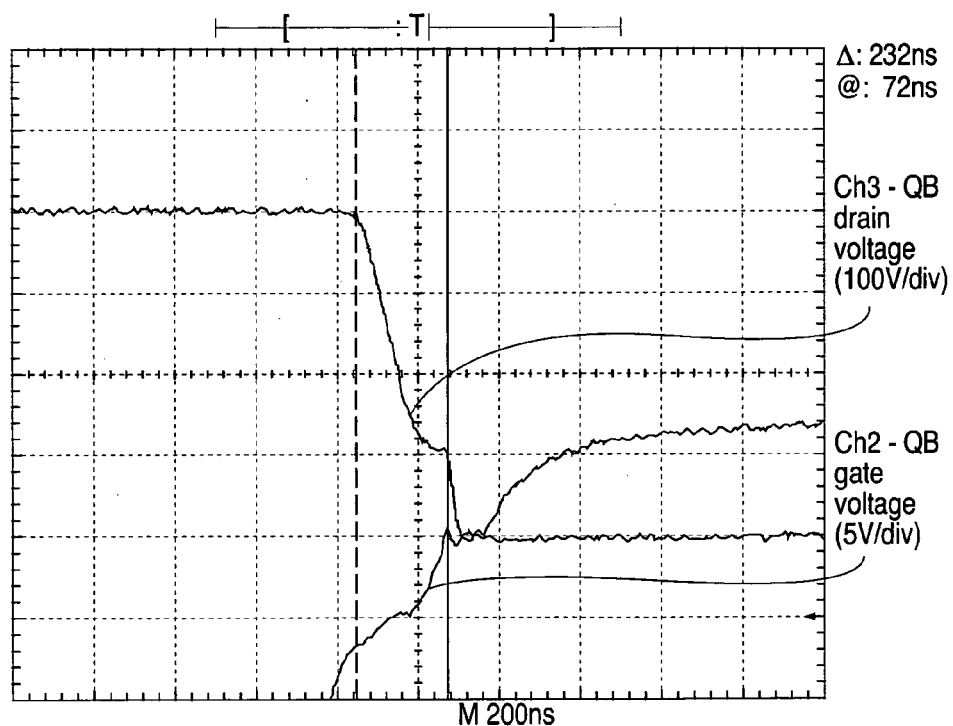
FIGS. 8A–8G are a set of waveforms showing results from the worst case of a full bridge with open primary.
Figure 8B:
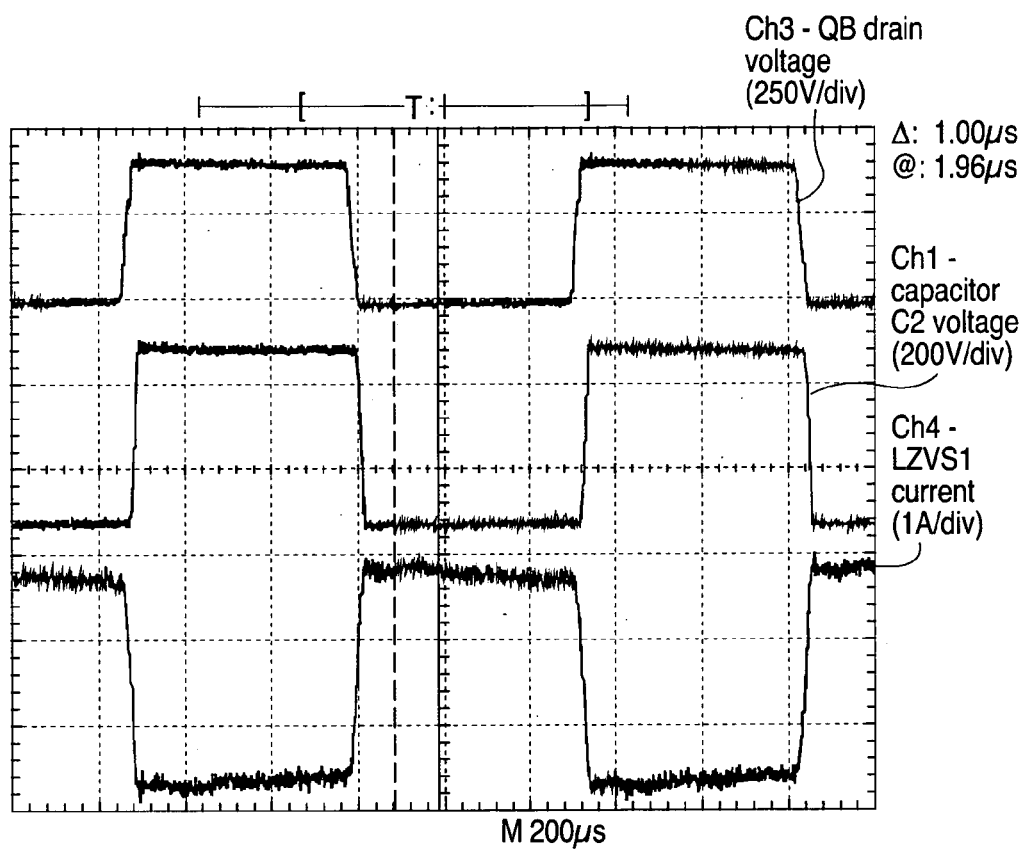
Figure 8C:
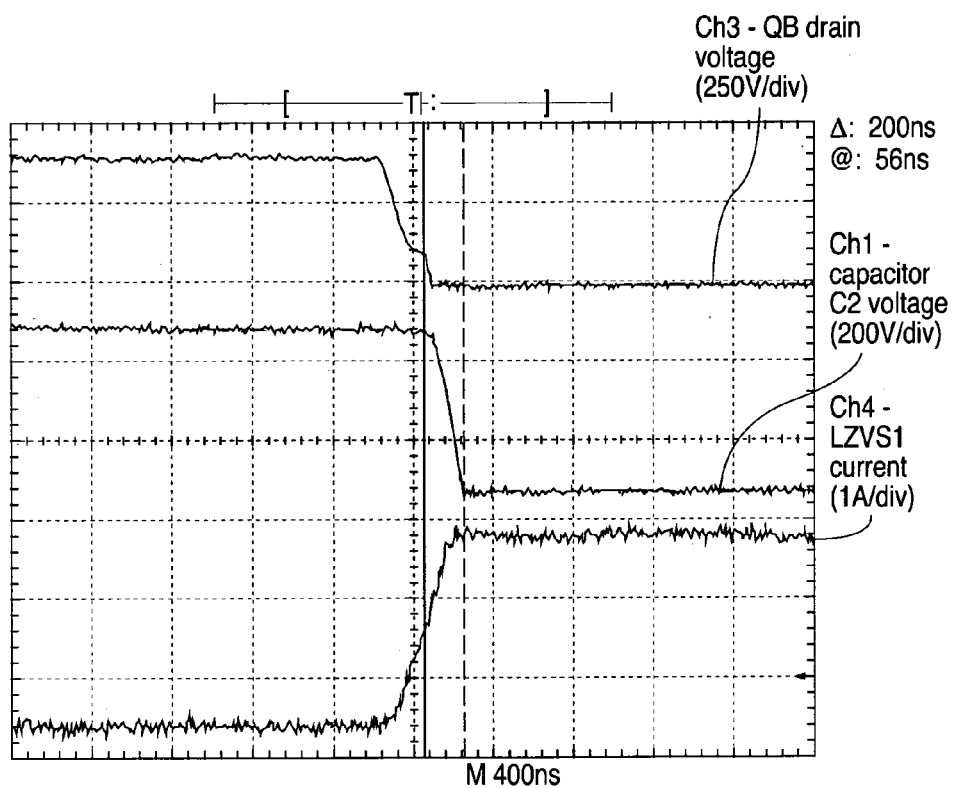
Figure 8D:
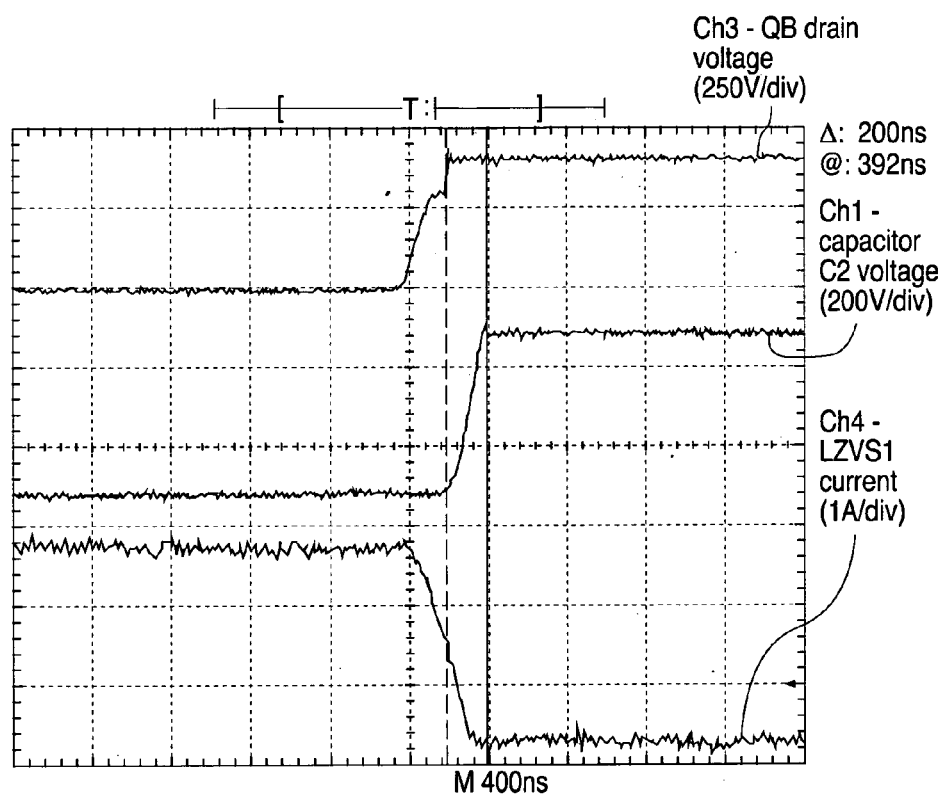
Figure 8E:
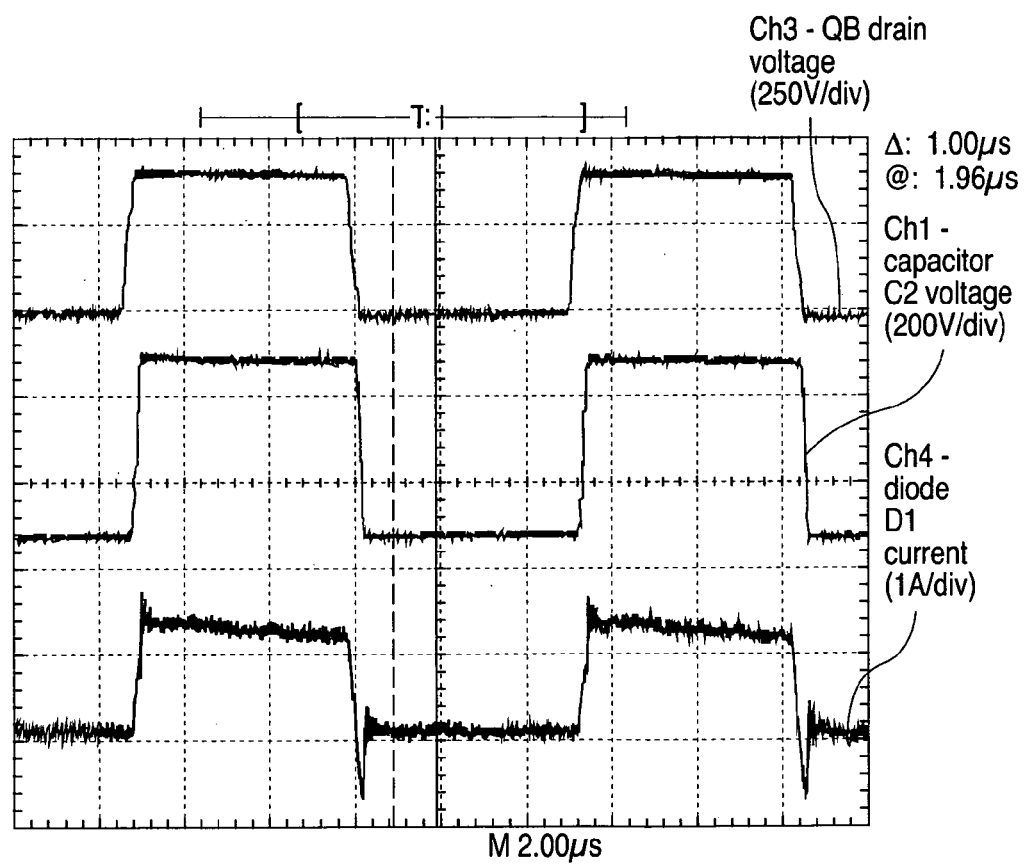
Figure 8F:
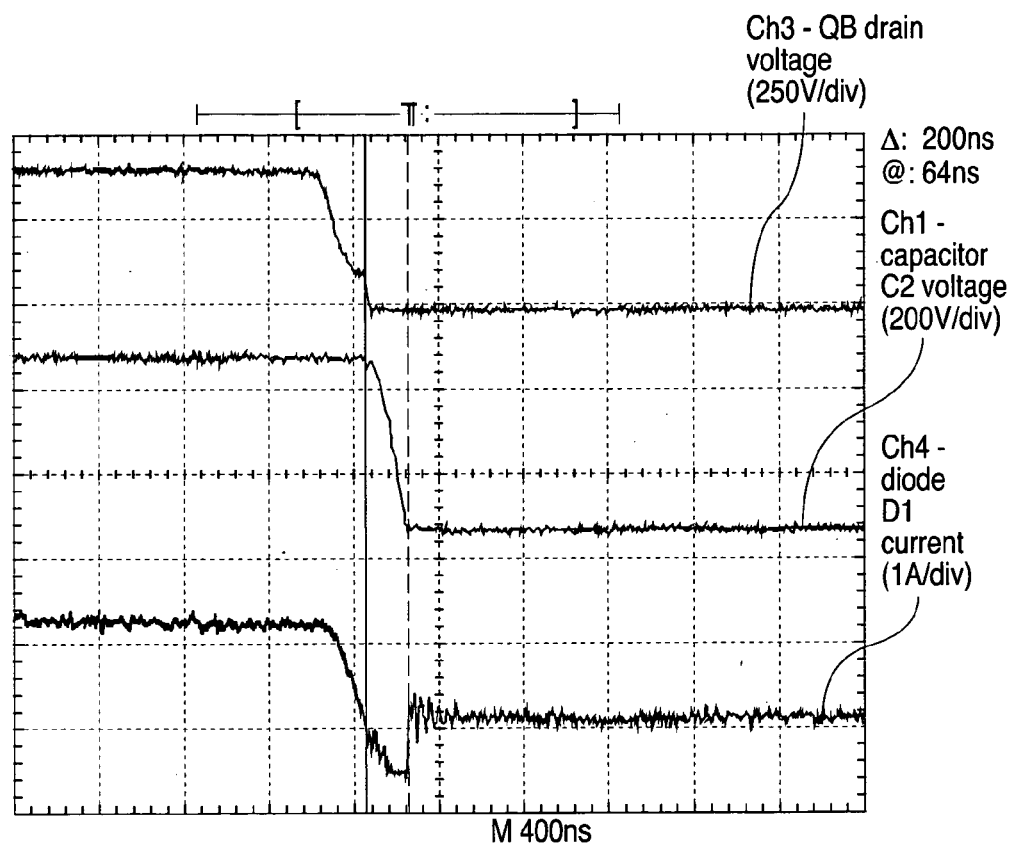
Figure 8G:
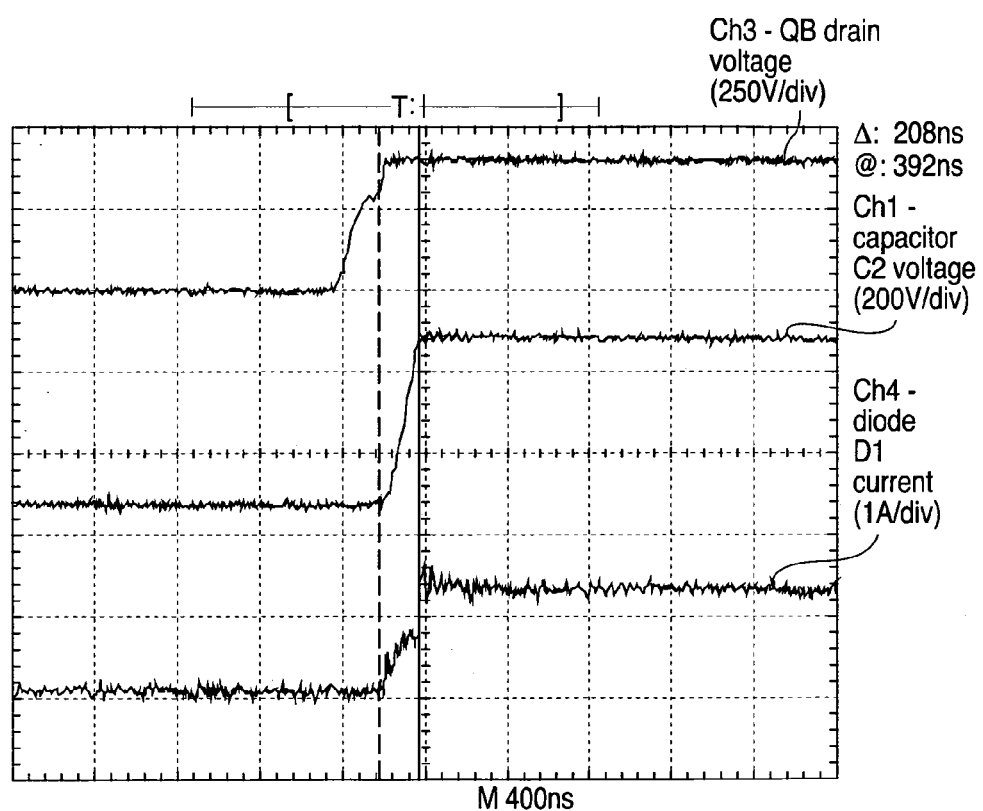

FIG. 7 is a circuit embodiment 300 according to present invention that reduces the complexity of the circuit in FIG. 6. The circuit 300 in FIG. 7 uses a split capacitor technique of the type used in the circuit 50 shown in FIG. 4, but in a much different way. The capacitors C1, C2, C3 and C4 in the circuit 300 shown in FIG. 7 are quite small and are not expected to provide a hard voltage source for the ZVS inductors. Capacitors C1, C2, C3 and C4 are selected such that these capacitors store only enough energy to achieve ZVS.

In operation, during the conduction period of switch Qa, its drain and source terminals are both at approximately the potential of Bulk +. Prior to the conduction period of switch Qa, the junction of capacitor C1 and capacitor C2 is charged to approximately 0.5 Vbulk. This charge builds current through inductor Lr1 while discharging capacitor C1. Capacitor C1 becomes fully discharged and the voltage at the junction of capacitor C1 and capacitor C2 reaches Bulk +. After capacitor C1 completely discharges, the current in inductor Lr1 cannot rise any further. The voltage at the lower end of inductor Lr1 starts to rise, but it gets clamped at a level one diode drop above Bulk + as diode D1 latches in and free wheels inductor Lr1. The current in inductor Lr1 falls very marginally during this free wheeling period if inductor Lr1 is designed with a high Q factor. When switch Qa turns off, the voltage at its source terminal falls down due to the resonant action of inductor Lr1. This causes the body capacitance of switch Qa to charge and, at the same time, discharges the body capacitance of Qb in preparation for a zero voltage turn on.

Similar action takes place during switching of each of the other power switches in FIG. 7. Alternatively, since the values of external capacitors C1, C2, C3, and C4 are very small, low power resistors can be used across them for equal voltage sharing. In practice, the values of these external capacitors and ZVS inductors Lr1 and Lr2 can be trimmed for the best compromise between the losses at light load and full load efficiency. Although diodes D1, D2, D3 and D4 have some reverse recovery current, the amplitude is small and the associated losses are negligible.

Figure 8:
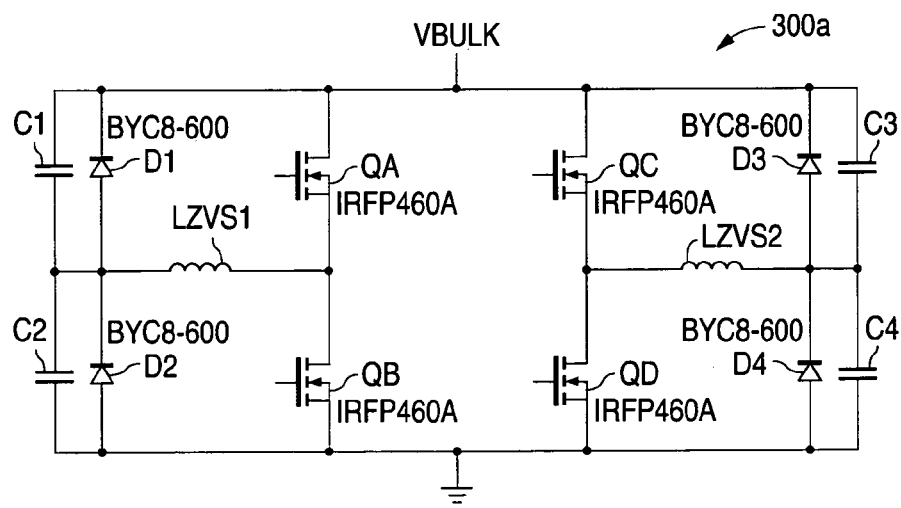
FIG. 8 is a circuit simulation representation for the circuit in FIG. 7.
Figure 2:
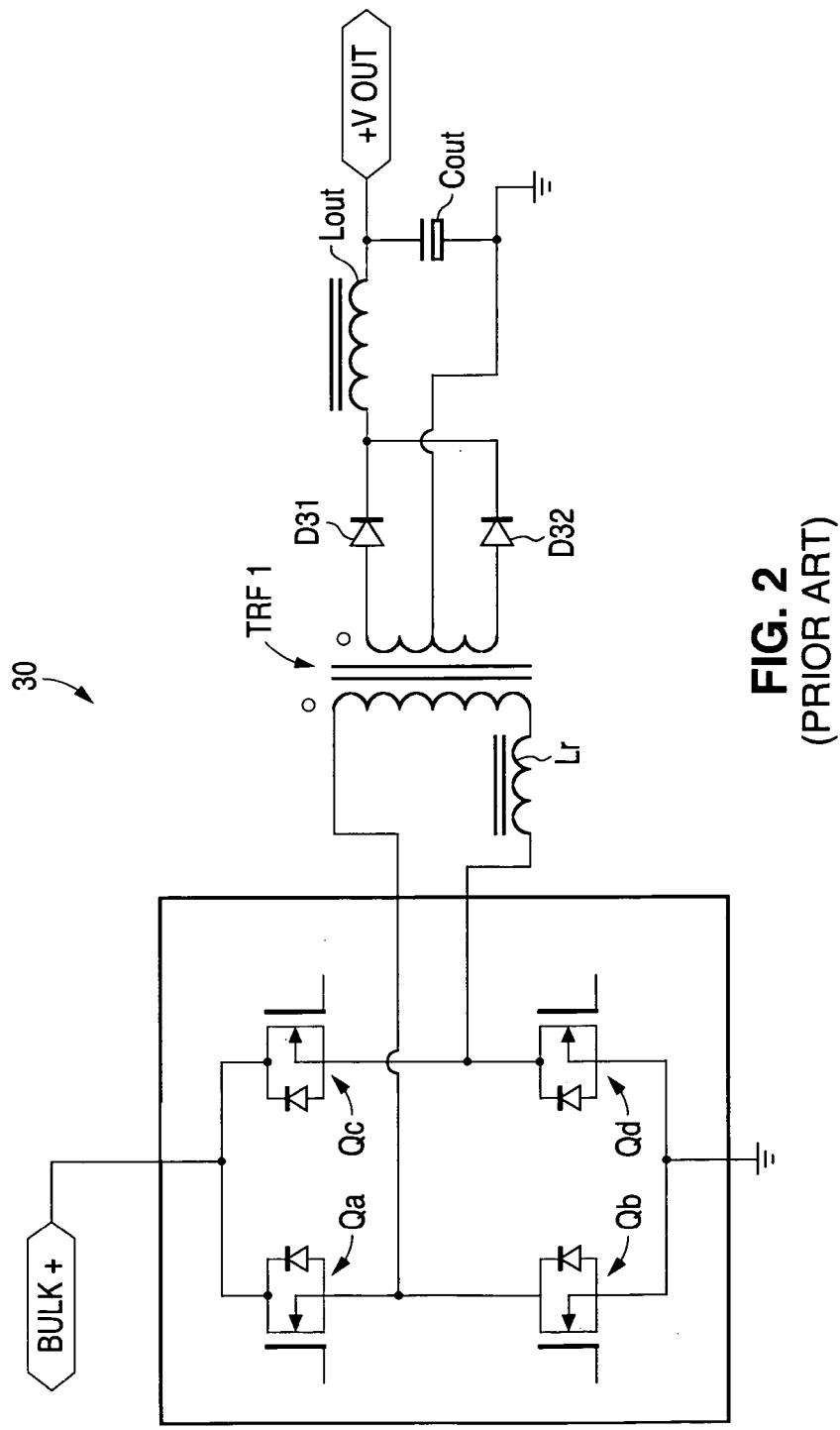
FIG. 2 is a circuit diagram of a prior art full bridge power converter having a primary side resonant inductor for achieving soft, zero voltage switching.
Figure 2A:
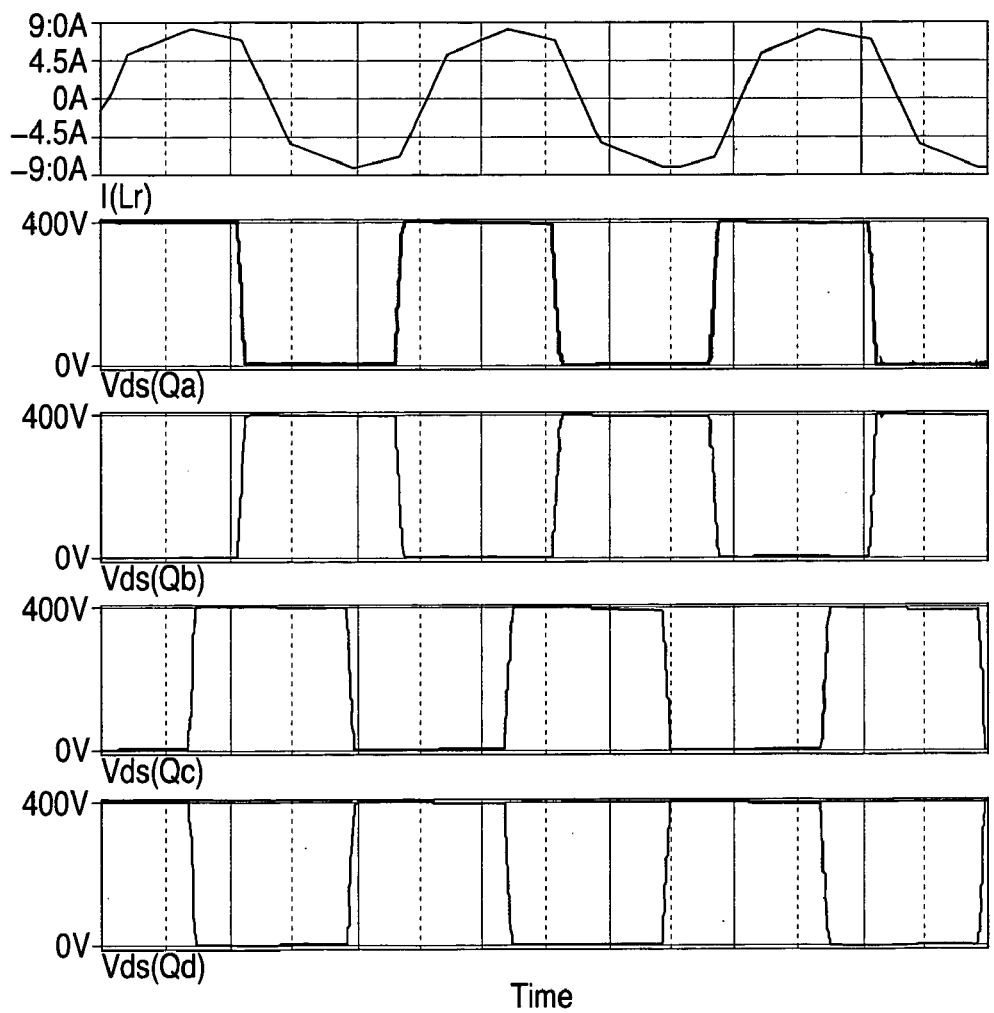
FIG. 2A is a set of voltage and current waveforms illustrating the operation of the power converter shown in FIG. 2.
Figure 3:
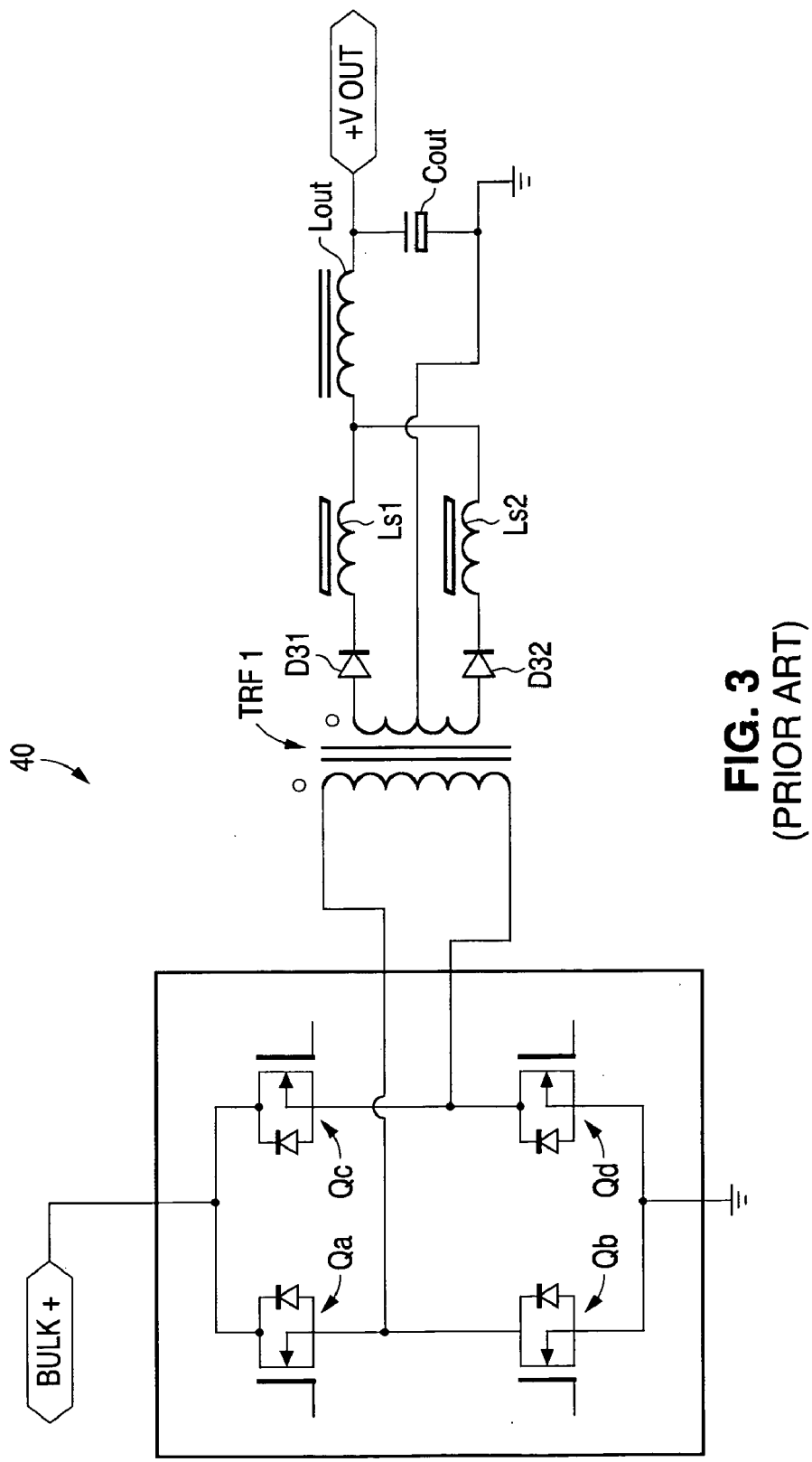
FIG. 3 is a prior art full bridge converter including two saturable inductors in series with secondary side rectifier diodes.

FIG. 8 is a circuit simulation representation 300a of the circuit shown in FIG. 7. FIGS. 8A–8G are a set of exemplary waveforms and component values illustrating measured results from the worst case of a full bridge with open primary for the circuit simulation representation 300a shown in FIG. 8. The inductor components appear in FIGS. 8A–8G as identified in the representation 300a in FIG. 8, e.g., inductors LZVS1 and LZVS2.

The waveforms in FIGS. 8A–8G show a practical compromise situation, wherein losses at light load are substantially reduced without increasing full-load losses. Thus, this situation shows "near zero voltage switching". A perfect ZVS is also achieved by trimming the values of external capacitors and inductors.

Figure 9:
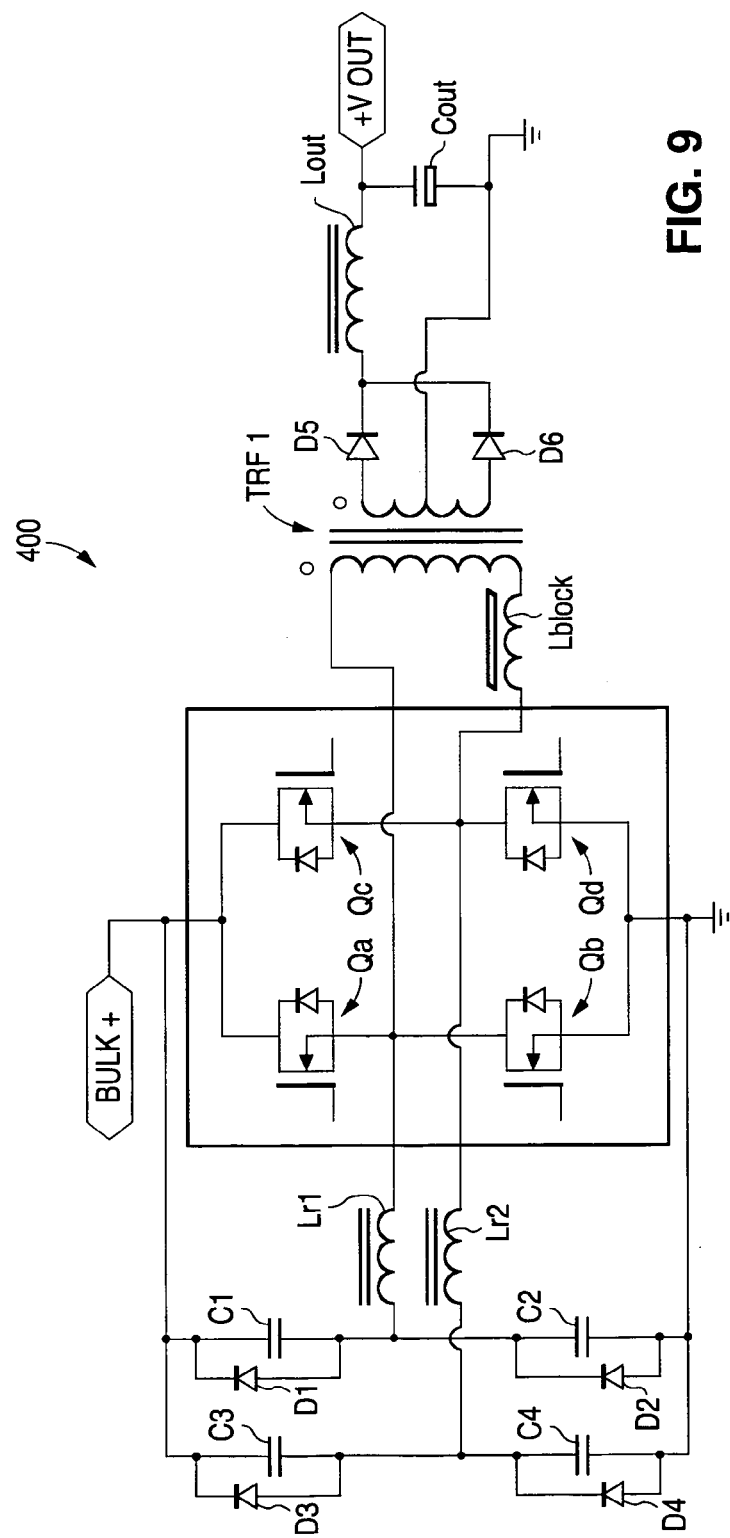
FIG. 9 is a circuit diagram of a preferred embodiment of the present invention that includes an extra inductor in series with the primary winding.

FIG. 9 is a circuit diagram of a preferred embodiment of the full bridge converter 400 according to the present invention that includes an extra series inductor. The extra inductor Lblock is in series with the primary winding as shown in FIG. 9. For embodiments without the extra series inductor Lblock, in practice, there could be problems with passive to active leg transitions. During these transitions, the current in inductor Lr1 or inductor Lr2 may just circulate in the transformer primary, resulting in partial hard switching of this leg. Lblock prevents such quick reversals of current and the energy in Lr could be used for ZVS transitions. It should be noted that the action of Lblock is expected to be like a switch, which would close after a short delay after reversal of voltage across it. Lblock could be a saturable choke or any kind of inductor, which offers high impedance to a sudden reversal of current. It is not expected that this inductor stores any energy. Alternatively, if the transformer design has a high enough leakage inductance, then Lblock can be omitted.

Having disclosed exemplary embodiments, modifications and variations may be made to the disclosed embodiments while remaining within the scope of the invention as described by the following claims.

What is claimed is:

1. In a DC-DC converter having first and second input terminals to which an input DC voltage is coupled and two output terminals where the output DC power is provided, a bridge having a first and second switching leg, each leg comprising two controlled switches connected in series, each switch having a switch capacitance and a control input, each switching leg connected between the input terminals and having a junction point between its series-connected switches; a transformer having a primary winding and a secondary winding each having a first and second end, said first end of said primary winding is connected to said junction point of said first switching leg; a rectifier and output filter circuit coupled between said secondary winding and said output terminals, a circuit comprising:
    a first capacitive voltage divider formed by a first and a second capacitor and connected between said input terminals;
    a second capacitive voltage divider formed by a third and a fourth capacitor and connected between said input terminals;
    a first and second diode each connected in parallel with a respective capacitor of said first capacitive voltage divider;
    a third and fourth diode each connected in parallel with a respective capacitor of said second capacitive voltage divider;
    a first inductor connected in series between said junction point of said first switching leg and a junction of said first and second capacitor;
    a second inductor connected in series between said junction point of said second switching leg and a junction of said third and fourth capacitor; and
    wherein each of said capacitors in said first and second capacitive dividers is selected such that each of said capacitors is capable of storing only enough energy required to enable substantially zero voltage switching of the respective switch to which said capacitor is coupled across.

2. The circuit of claim 1, further comprising a third inductor for providing high impedance to a sudden reversal of current, having an end connected to said junction point of said second switching leg and another end connected to said second end of said primary winding.

3. The circuit of claim 2, wherein said third inductor comprises a saturable choke.

4. The circuit of claim 1, wherein said first and second inductors comprise resonant inductors for charging and discharging each of said switch capacitances.

5. The circuit of claim 2, wherein said transformer has a leakage inductance above a predetermined amount and said third inductor comprises said leakage inductance.

6. The circuit of claim 1, wherein substantially complementary control signals are provided to said control inputs of said switches in said first switching leg so that the corresponding switches conduct alternately with dead times there between, and wherein relatively phase shifted substantially complementary control signals are provided to said control inputs of said switches in said second switching leg so that the corresponding switches conduct alternately with dead times there between; wherein each switching capacitance is discharged during its respective switch's dead time.

7. The circuit of claim 1, wherein each of said switches is a MOSFET.

8. The circuit of claim 1, wherein each said junction point provides a voltage mid-way between the voltages of the input terminals.

9. The circuit of claim 1, wherein said secondary winding has a center tap and said rectifier and output filter circuit comprises a fourth inductor, a fifth and a sixth diode each connected between a respective end of the secondary winding and one end of said fourth inductor for providing full wave rectification, and a fifth capacitor coupled between another end of the fourth inductor and the center tap of said secondary winding.

10. The circuit of claim 1, wherein each of said diodes has an anode and a cathode, wherein said anode of said first diode is connected to said cathode of said second diode and wherein said anode of said second diode is connected to said second input terminal and said cathode of said first diode is connected to said first input terminal.

11. The circuit of claim 10, wherein said anode of said third diode is connected to said cathode of said fourth diode and wherein said anode of said fourth diode is connected to said second input terminal and said cathode of said third diode is connected to said first input terminal.

12. A DC-DC converter having first and second input terminals to which an input DC voltage is coupled and two output terminals where the output DC power is provided, comprising:

a bridge having a first and second switching leg, each leg comprising two controlled switches connected in series, each switch having a switch capacitance and a control input, each switching leg connected between the input terminals and having a junction point between its series-connected switches;

a transformer having a primary winding and a secondary winding each having a first and second end, said first end of said primary winding is connected to said junction point of said first switching leg;

a rectifier and output filter circuit coupled between said secondary winding and said output terminals;

a first capacitive voltage divider formed by a first and a second capacitor and connected between said input terminals;

a second capacitive voltage divider formed by a third and a fourth capacitor and connected between said input terminals;

a first and second diode each connected in parallel with a respective capacitor of said first capacitive voltage divider;

a third and fourth diode each connected in parallel with a respective capacitor of said second capacitive voltage divider;

a first resonant inductor connected in series between said junction point of said first switching leg and a junction of said first and second capacitor;

a second resonant inductor connected in series between said junction point of said second switching leg and a junction of said third and fourth capacitor; and wherein each of said capacitors in said first and second capacitive dividers is selected such that each of said capacitors is capable of storing only enough energy required to enable substantially zero voltage switching of the respective switch to which said capacitor is coupled across.

13. The converter of claim 12, further comprising a third inductor for providing high impedance to a sudden reversal of current, having an end connected to said junction point of said second switching leg and another end connected to said second end of said primary winding.

14. In a DC-DC converter having first and second input terminals to which an input DC voltage is coupled and two output terminals where the output DC power is provided, a bridge having a first and second switching leg, each leg comprising two controlled switches connected in series, each switch having a switch capacitance and a control input, each switching leg connected between the input terminals and having a junction point between its series-connected switches; a transformer having a primary winding and a secondary winding each having a first and second end, said first end of said primary winding is connected to said junction point of said first switching leg, a rectifier and output filter circuit coupled between said secondary winding and said output terminals, a circuit comprising:

four capacitors each coupled across a respective one of said switches;

a first plurality of four diodes, connected each in parallel with a respective one of said capacitors;

four resonant inductors, a second plurality of four diodes, connected each in a series combination with a respective one of said resonant inductors and a respective of said switches, each said series combination being connected in parallel with a respective one of said capacitors;

a voltage source;

a fifth switch connected in series with a respective series-connected resonant inductor and diode between said junction point of said first switching leg and said voltage source;

a sixth switch connected in series with a respective series-connected resonant inductor and diode between said junction point of said second switching leg and said voltage source; and a ninth diode and a tenth diode connected each in series with a respective series-connected resonant inductor and diode between said first input terminal and said voltage source.

* * * * *